United States Patent
Chng et al.

(10) Patent No.: US 11,825,182 B2
(45) Date of Patent: Nov. 21, 2023

(54) CAMERA MODULE WITH IR LEDS FOR UNIFORM ILLUMINATION

(71) Applicant: Waymo LLC, Mountain View, CA (US)

(72) Inventors: Choon Ping Chng, Los Altos, CA (US); Cheng-Han Wu, Sunnyvale, CA (US); Scott Duncan, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/067,840

(22) Filed: Oct. 12, 2020

(65) Prior Publication Data
US 2022/0116517 A1    Apr. 14, 2022

(51) Int. Cl.
  *H04N 23/56*    (2023.01)
  *B60R 11/04*    (2006.01)
  (Continued)

(52) U.S. Cl.
  CPC ............. *H04N 23/56* (2023.01); *B60R 11/04* (2013.01); *G02B 3/0006* (2013.01);
  (Continued)

(58) Field of Classification Search
  USPC ........................................................ 348/386
  See application file for complete search history.

(56) References Cited

U.S. PATENT DOCUMENTS

| | | | |
|---|---|---|---|
| 5,701,015 A | 12/1997 | Lungershausen et al. | |
| 6,394,349 B1 * | 5/2002 | Shigekusa ........... | G06K 7/10732 235/454 |

(Continued)

FOREIGN PATENT DOCUMENTS

| | | |
|---|---|---|
| CN | 105020677 A | 11/2015 |
| JP | 2015076872 A | 4/2015 |

(Continued)

OTHER PUBLICATIONS

Moreno et al., "Uniform Illumination of Distant Targets Using a Spherical Light-Emitting Diode Array", Optical Engineering, vol. 46, No. 3, Mar. 2007.

(Continued)

*Primary Examiner* — Hung Q Dang
(74) *Attorney, Agent, or Firm* — McDonnell Boehnen Hulbert & Berghoff LLP

(57) ABSTRACT

A camera module includes a housing with an opening and a portion that surrounds the opening, wherein the portion of the housing is transparent to near infrared (NIR) light. A fisheye lens is disposed within the opening such that a portion of the fisheye lens protrudes through the opening. An image sensor is disposed within the housing and optically coupled to the fisheye lens. The image sensor is sensitive to visible light and NIR light. A plurality of NIR light emitters is disposed within the housing. The NIR light emitters are configured to emit NIR light through the NIR-transparent portion of the housing. The NIR-transparent portion of the housing may include a light-diffusing structure, such as a pattern of microlenses formed on an inner surface of the NIR-transparent portion of the housing, to spread out the NIR light emitted by the NIR light emitters.

20 Claims, 11 Drawing Sheets

(51) Int. Cl.
    *G02B 3/00*      (2006.01)
    *G02B 5/02*      (2006.01)
    *G02B 5/20*      (2006.01)
    *G02B 13/06*     (2006.01)
    *H04N 23/54*     (2023.01)
    *H04N 23/55*     (2023.01)
    *B60R 11/00*     (2006.01)
    *H04N 5/76*      (2006.01)

(52) U.S. Cl.
    CPC ......... *G02B 5/0215* (2013.01); *G02B 5/0278* (2013.01); *G02B 5/208* (2013.01); *G02B 13/06* (2013.01); *H04N 23/54* (2023.01); *B60R 2011/0003* (2013.01); *H04N 5/76* (2013.01)

(56) References Cited

U.S. PATENT DOCUMENTS

| | | | |
|---|---|---|---|
| 6,614,579 | B2 | 9/2003 | Roberts et al. |
| 8,581,982 | B1 | 11/2013 | Haley et al. |
| 9,296,339 | B2 | 3/2016 | Bingle et al. |
| 9,621,769 | B2 | 4/2017 | Mai et al. |
| 10,218,916 | B2 | 2/2019 | Dorai et al. |
| 10,277,786 | B1 | 4/2019 | Leonelli, Jr. |
| 10,530,977 | B2 | 1/2020 | Kearsley et al. |
| 2006/0284062 | A1* | 12/2006 | Altendorf .......... G01D 5/34715 250/231.13 |
| 2009/0289187 | A1 | 11/2009 | Mian |
| 2011/0216537 | A1* | 9/2011 | Holder ................. F21V 31/005 362/311.01 |
| 2015/0002674 | A1* | 1/2015 | Kleve .................... H04N 7/183 348/149 |
| 2015/0062347 | A1* | 3/2015 | Jin ....................... H04N 9/0451 348/164 |
| 2016/0205318 | A1* | 7/2016 | Wang .................... H04N 5/2256 348/36 |
| 2017/0302834 | A1 | 10/2017 | Lee et al. |
| 2018/0255622 | A1 | 9/2018 | Spero |
| 2019/0293843 | A1* | 9/2019 | Ripoll .................. G02B 5/0278 |
| 2020/0200356 | A1* | 6/2020 | Potter ...................... B60Q 1/28 |
| 2020/0204713 | A1* | 6/2020 | Potter .................. H04N 5/2256 |
| 2020/0236252 | A1 | 7/2020 | Song et al. |
| 2021/0058568 | A1* | 2/2021 | Ivanov Bonev ....... H04N 5/332 |
| 2022/0015673 | A1* | 1/2022 | Gruber ............... A61B 5/14552 |

FOREIGN PATENT DOCUMENTS

| | | |
|---|---|---|
| WO | 2018197074 A1 | 11/2018 |
| WO | 2018217268 A1 | 11/2018 |
| WO | 2019020713 A1 | 1/2019 |

OTHER PUBLICATIONS

International Application No. PCT/US2021/053899, International Search Report and Written Opinion, dated Jan. 21, 2022.

* cited by examiner

CAMERA MODULE WITH IR LEDS FOR UNIFORM ILLUMINATION

BACKGROUND

Unless otherwise indicated herein, the materials described in this section are not prior art to the claims in this application and are not admitted to be prior art by inclusion in this section.

A camera can be configured to capture still images or video images within a field of view that is defined by an optical system (e.g., a lens) of the camera. In some applications, it can be useful to provide the camera with the ability to actively illuminate the camera's field of view. For example, the camera may include one or more light sources that can be activated when the camera is capturing images. Thus, when conditions are dark, the camera may illuminate the field of view using one or more light sources) in order to capture images that are brighter and have more contrast.

Providing the camera with the ability to actively illuminate its field of view can be challenging, however, when the camera has a very wide field of view. For example, a camera may include a wide-angle lens, such as a fisheye lens, that enables the camera to capture images within a wide field of view (e.g., a 180-degree field of view). It can be difficult to configure the one or more light sources so that they illuminate the wide field of view uniformly. This is because many types of light sources are directional along an optical axis. For such light sources, the intensity of the emitted light for angles $\theta$ relative to the optical axis may fall off as $\cos^4 \theta$. Accordingly, there is a need to provide cameras having a wide field of view with the ability to actively illuminate the field of view uniformly.

SUMMARY

This disclosure relates to a camera module that has a wide field of view (e.g., provided by a fisheye lens) and a plurality of light emitting diodes (LEDs) or other light emitters that are configured to emit light (e.g., near infrared light) that illuminates the field of view of the camera module. The camera module may include light-diffusing structures (e.g., microlenses) that spread out the light emitted by the light emitters to provide illumination that is substantially uniform throughout the field of view of the camera module. In some implementations, the camera module could be mounted in the passenger cabin of a vehicle (e.g., an autonomous vehicle) and controlled by a computing system in the vehicle.

In one aspect, an apparatus is provided. The apparatus includes a housing, wherein the housing includes an opening and a portion that surrounds the opening. The portion of the housing is transparent to near infrared (NIR) light. The apparatus also includes a fisheye lens disposed within the opening such that a portion of the fisheye lens protrudes through the opening. The apparatus further includes an image sensor that is disposed within the housing and optically coupled to the fisheye lens. The image sensor is sensitive to visible light and NIR light. The apparatus additionally includes a plurality of NIR light emitters disposed within the housing. The NIR light emitters are configured to emit NIR light through the NIR-transparent portion of the housing.

In another aspect, a camera module is provided. The camera module includes a housing, wherein the housing includes an opening and a portion that surrounds the opening. The portion of the housing is transparent to near infrared (NIR) light and opaque to visible light. The NIR transparent portion of the housing includes a light-diffusing structure. The camera module also includes a fisheye lens disposed within the opening such that a portion of the fisheye lens protrudes through the opening. The camera module further includes an image sensor that is disposed within the housing and optically coupled to the fisheye lens. The image sensor is sensitive to visible light and NIR light. The camera module additionally includes a plurality of NIR light emitters disposed within the housing. The NIR light emitters are configured to emit NIR light through the light-diffusing structure.

In yet another aspect, a method is provided. The method includes capturing an image of a field of view by an image sensor of a camera module, wherein the field of view is provided by a fisheye lens optically coupled to the image sensor. The method further includes illuminating the field of view with near infrared light emitted by a plurality of light emitting diodes (LEDs) while capturing the image of the field of view. Illuminating the field of view involves spreading out the near infrared light emitted by the LEDs by a light-diffusing structure in the camera module.

These as well as other aspects, advantages, and alternatives will become apparent to those of ordinary skill in the art by reading the following detailed description, with reference, where appropriate, to the accompanying drawings.

DETAILED DESCRIPTION

Figure 1:
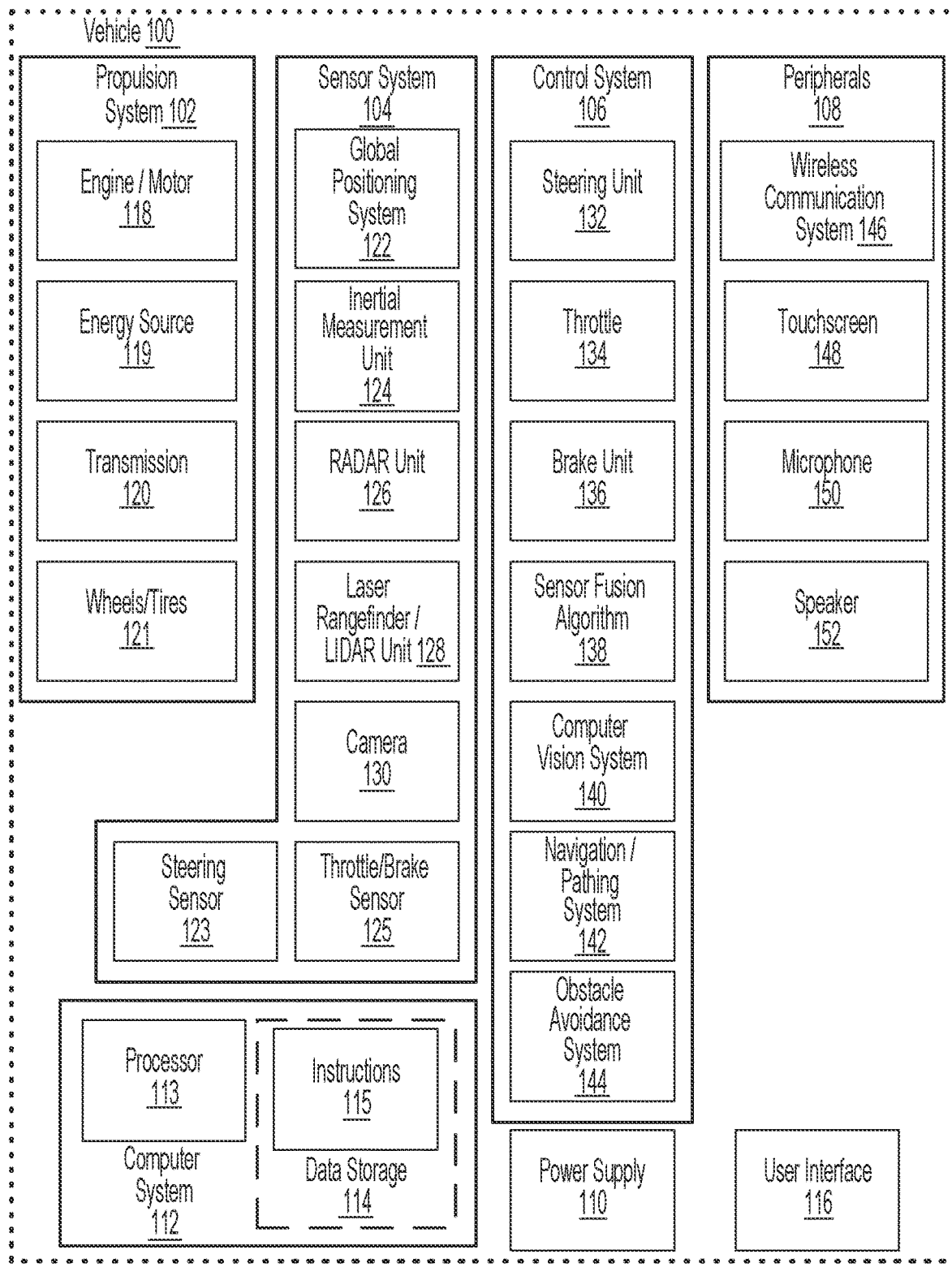
FIG. 1 is a functional block diagram illustrating a vehicle, according to example embodiments.
Figure 2A:
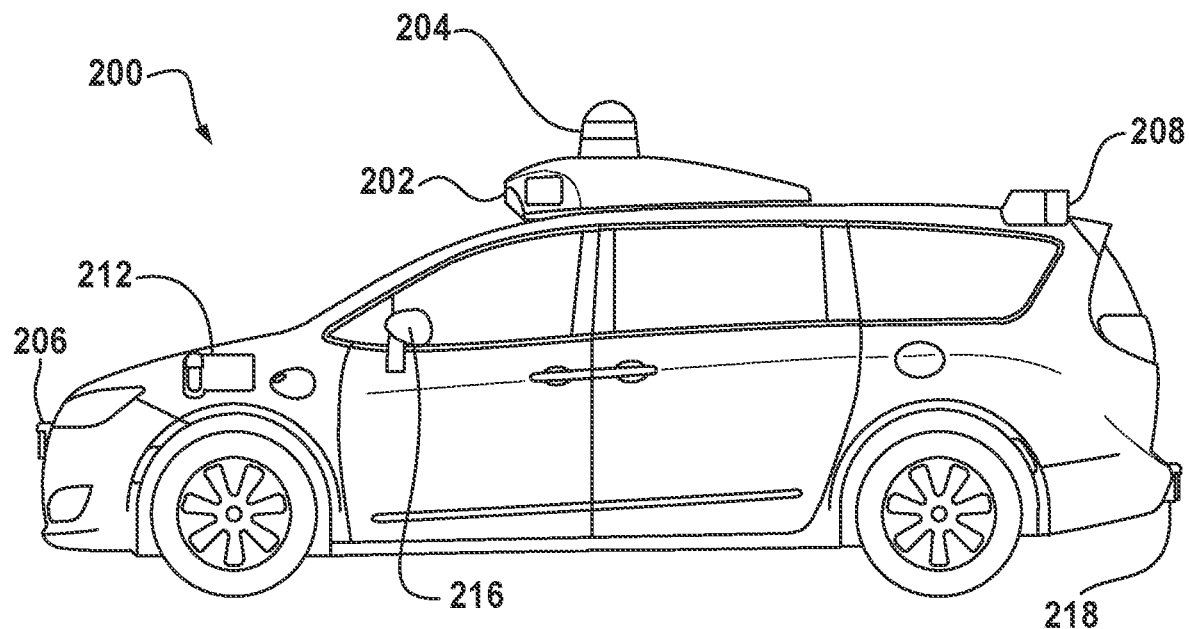
FIG. 2A is an illustration of a physical configuration of a vehicle, according to example embodiments.
Figure 2B:
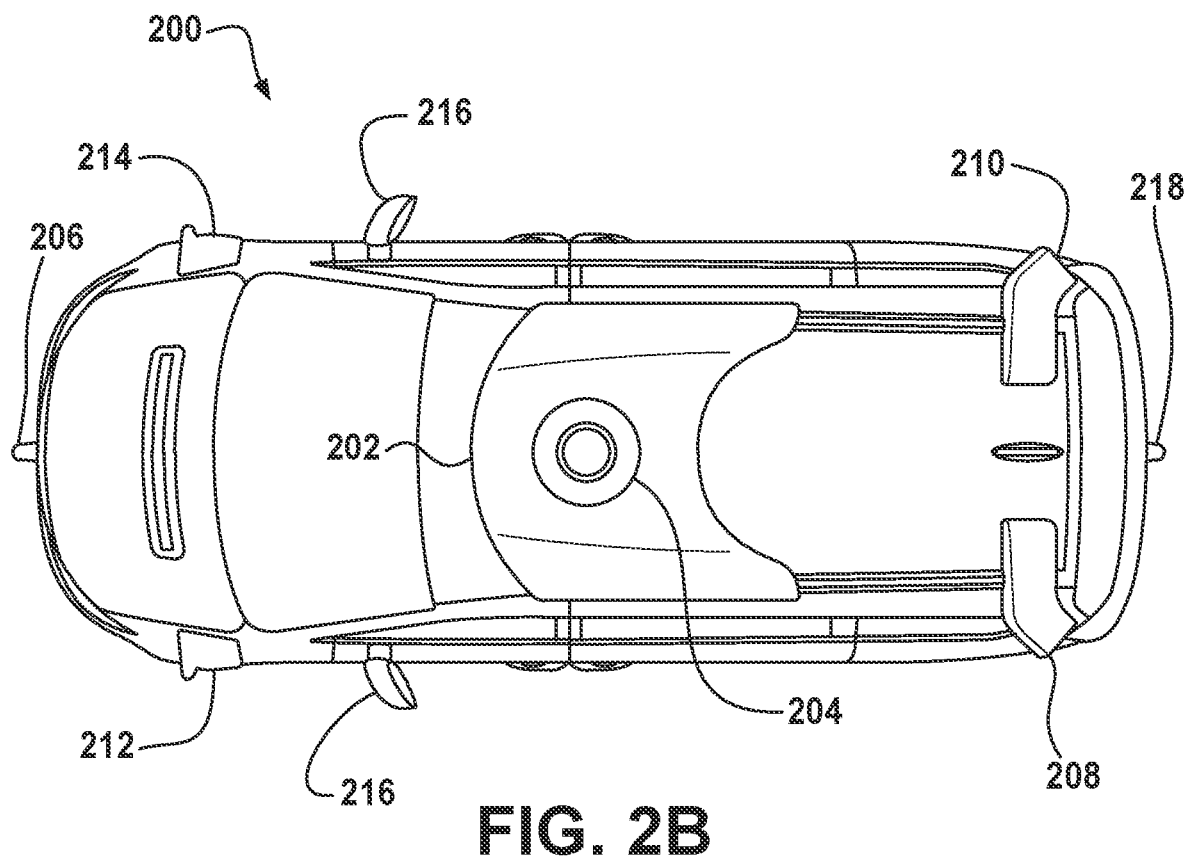
FIG. 2B is an illustration of a physical configuration of a vehicle, according to example embodiments.
Figure 2C:
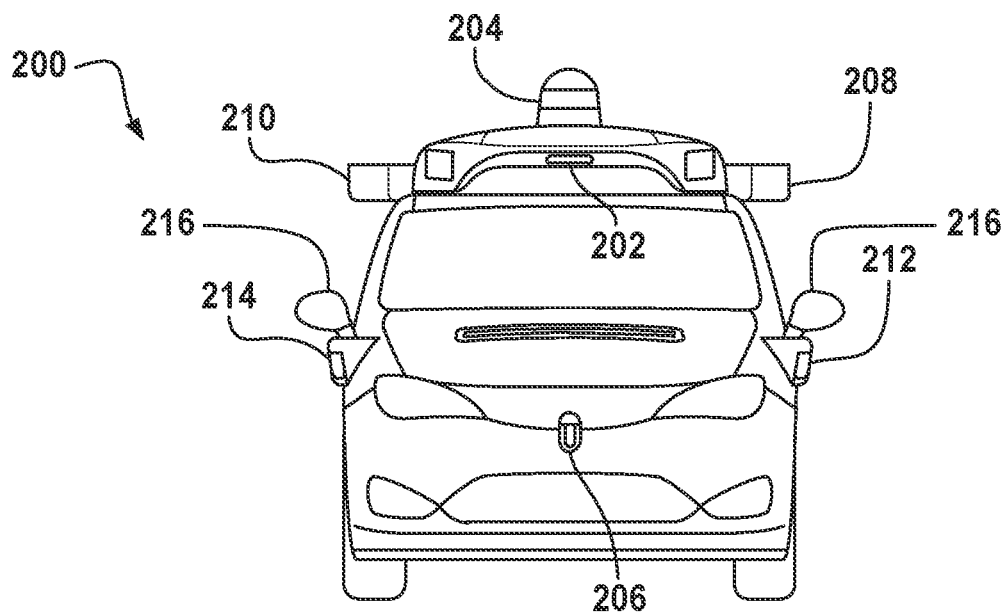
FIG. 2C is an illustration of a physical configuration of a vehicle, according to example embodiments.
Figure 2D:
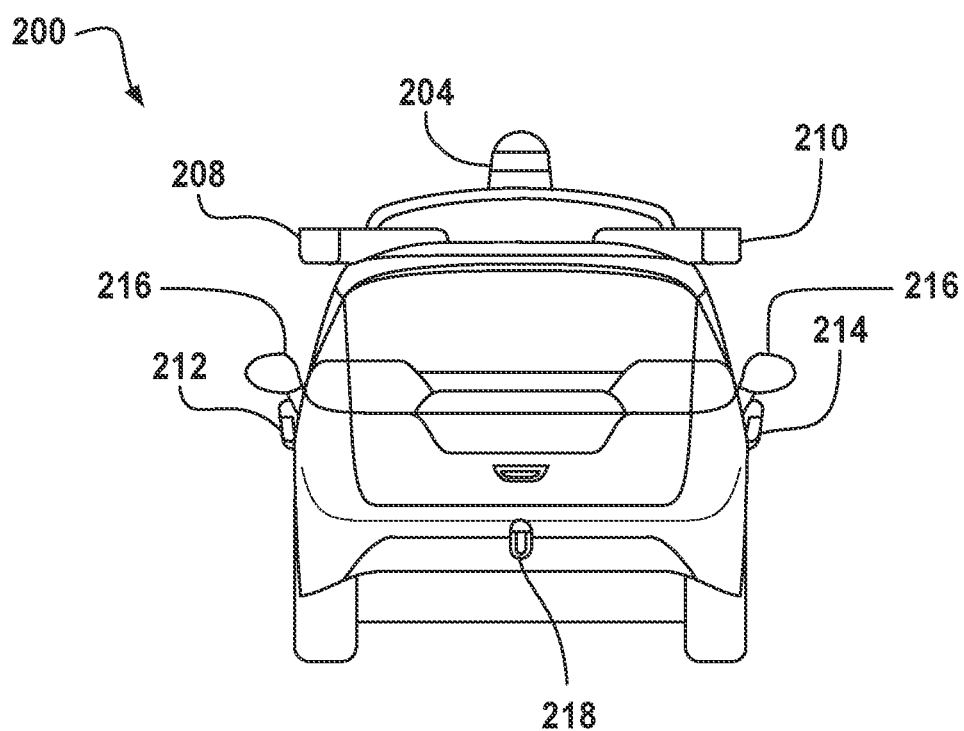
FIG. 2D is an illustration of a physical configuration of a vehicle, according to example embodiments.
Figure 2E:
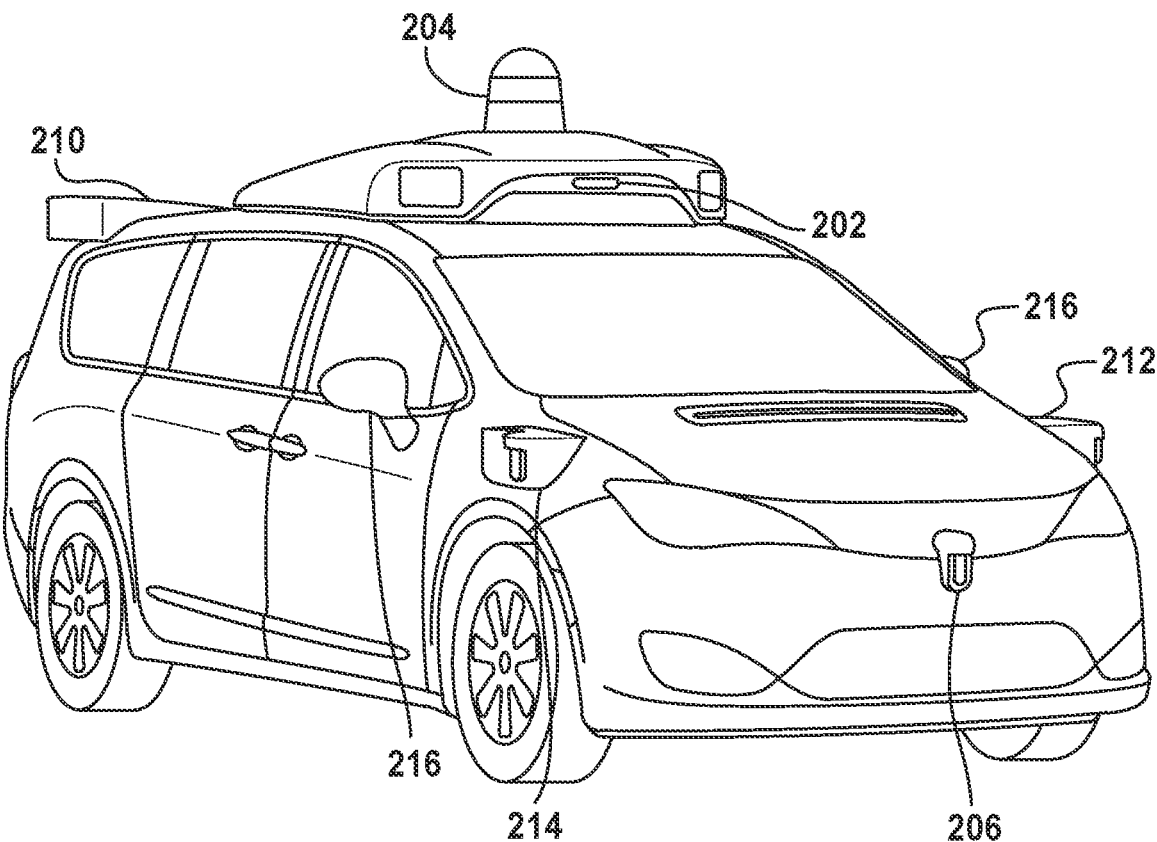
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. OVERVIEW

A camera module can be used as part of an internal vision system of a vehicle that can obtain images of the driver and/or passengers inside the vehicle. In example embodiments, the camera module includes an image sensor that is sensitive to visible and near infrared (NIR) light, and the image sensor is optically coupled to a fisheye lens that provides the camera module with a wide (e.g., 180-degree) field of view. The camera module also includes a plurality of light sources that can illuminate the field of view during low light conditions. The light sources could be, for example, LEDs that emit near infrared light (e.g., light with a wavelength of about 850 nm).

The camera module can be configured such that the illumination from the light emitters is substantially uniform throughout the field of view of the camera module. For example, it may be desirable for the intensity of the light emitted by the light emitters to vary less than 20%, less than 30%, less than 40%, or less than 50% over the entire field of view of the camera module, depending on the application. To achieve this level of uniformity, the light emitters can be configured to emit light through a light-diffusing structure in the camera module. For example, the light emitters may be disposed within a housing that includes a NIR-transparent portion (e.g., a front cover) that is transparent to NIR light. The light-diffusing structure may be formed in the NIR-transparent portion of the housing. For example, the light-diffusing structure may be provided as a pattern of microlenses formed on an inner surface of the NIR-transparent surface of the housing. The light emitters may be configured to emit light through the NIR-transparent portion of the housing, such that the light-diffusing structure spreads out the emitted light to provide substantially uniform illumination throughout the field of view of the camera module.

The camera module may also include optical structures that direct the light emitted by the light emitters away from the optical axis of the camera module. For example, the light emitters may be arranged such that they each have a respective optical axis that is parallel to the optical axis of the camera module. However, each of the light emitters may be provided with an optical structure (e.g., an asymmetric cover lens) that directs the light away from the light emitter's optical axis so that the peak intensity of the light emitter's illumination is at an angle (e.g., an angle between 5 degrees and 20 degrees) with respect to optical axis of the camera module instead of parallel to it.

The fisheye lens may be disposed within an opening in the NIR-transparent portion of the housing such that a portion of the fisheye lens protrudes through the opening. The fisheye lens may be surrounded by an opaque ring in the opening. The opaque ring may limit the field of view of the fisheye lens and may be block light from entering the fisheye lens via (i) a direct path from the light emitters and (ii) via an indirect path involving reflection from a surface of the NIR-transparent portion of the housing. In this way, when the light emitters illuminate the field of view, the light that enters the fisheye lens is light from the light emitters that has been reflected from objects in the field of view rather than stray light from within the camera module itself.

II. EXAMPLE VEHICLE SYSTEMS

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as GPS 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/lidar 128 may include one or more photodetectors. Such photodetectors may be especially sensitive detectors (e.g., avalanche photodiodes (APDs)). In some examples, such photodetectors may be capable of detecting single photons (e.g., SPADs). Further, such photodetectors can be arranged (e.g., through an electrical connection in series) into an array (e.g., as in a SiPM). In some examples, the one or more photodetectors are Geiger-mode operated devices and the lidar includes subcomponents designed for such Geiger-mode operation.

Camera 130 may include one or more devices configured to capture images (e.g., still images or video images) of the environment of vehicle 100. Alternatively or additionally, camera 130 may include one more devices configured to capture images (e.g., still images or videos) of a passenger cabin inside of vehicle 100.

Steering sensor 123 may sense a steering angle of vehicle 100, which may involve measuring an angle of the steering wheel or measuring an electrical signal representative of the angle of the steering wheel. In embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216, 218 at which a radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208, 210 and/or the first and second lidar units 204, 206 can actively scan the surrounding environment for the presence of potential obstacles and can be similar to the radar 126 and/or laser rangefinder/lidar 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, inertial sensors, humidity sensors, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths and/or elevations. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first lidar/radar unit 212 and the second lidar/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
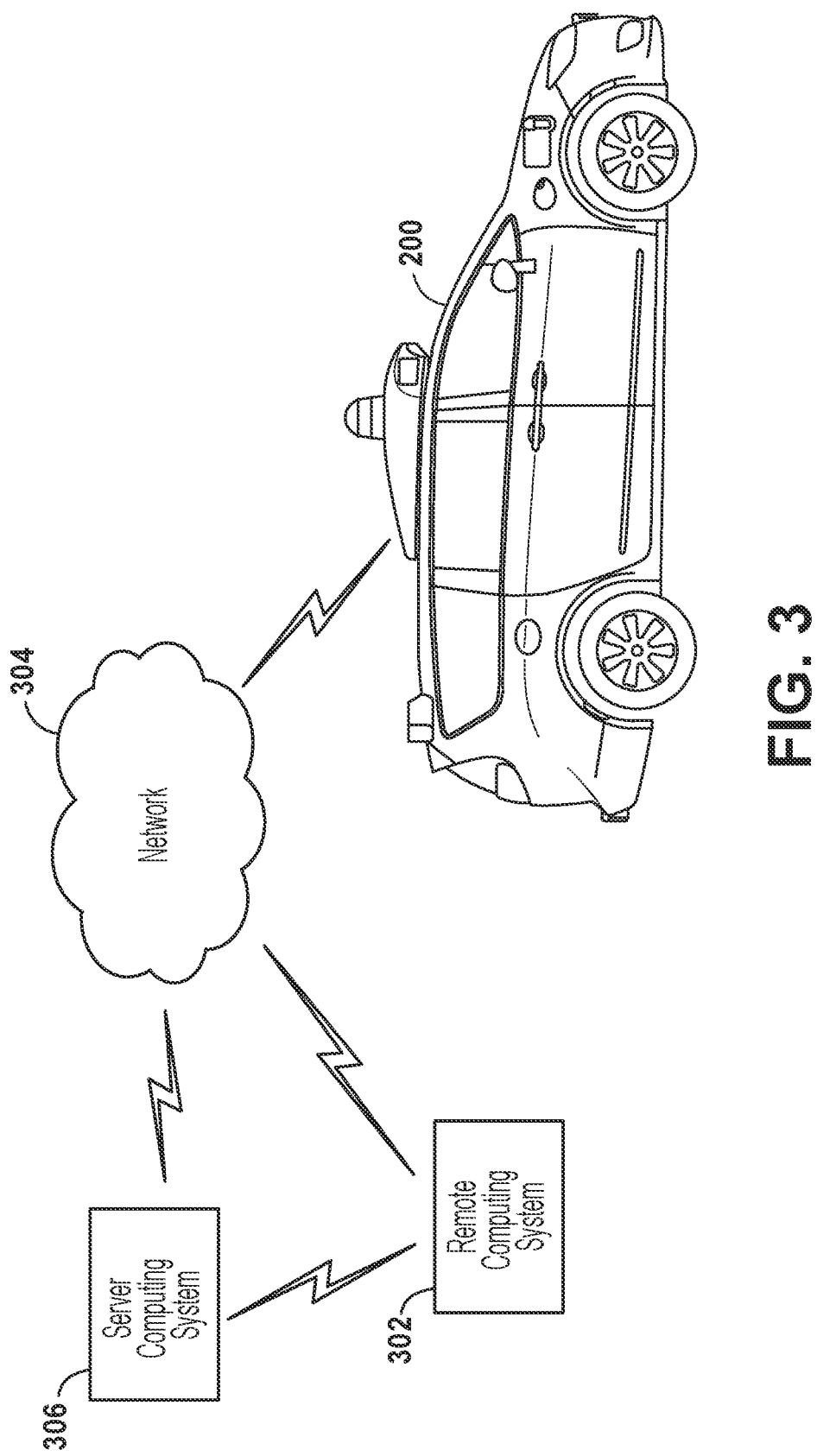
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., infrared light) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

III. EXAMPLE CAMERA MODULE

Figure 4A:
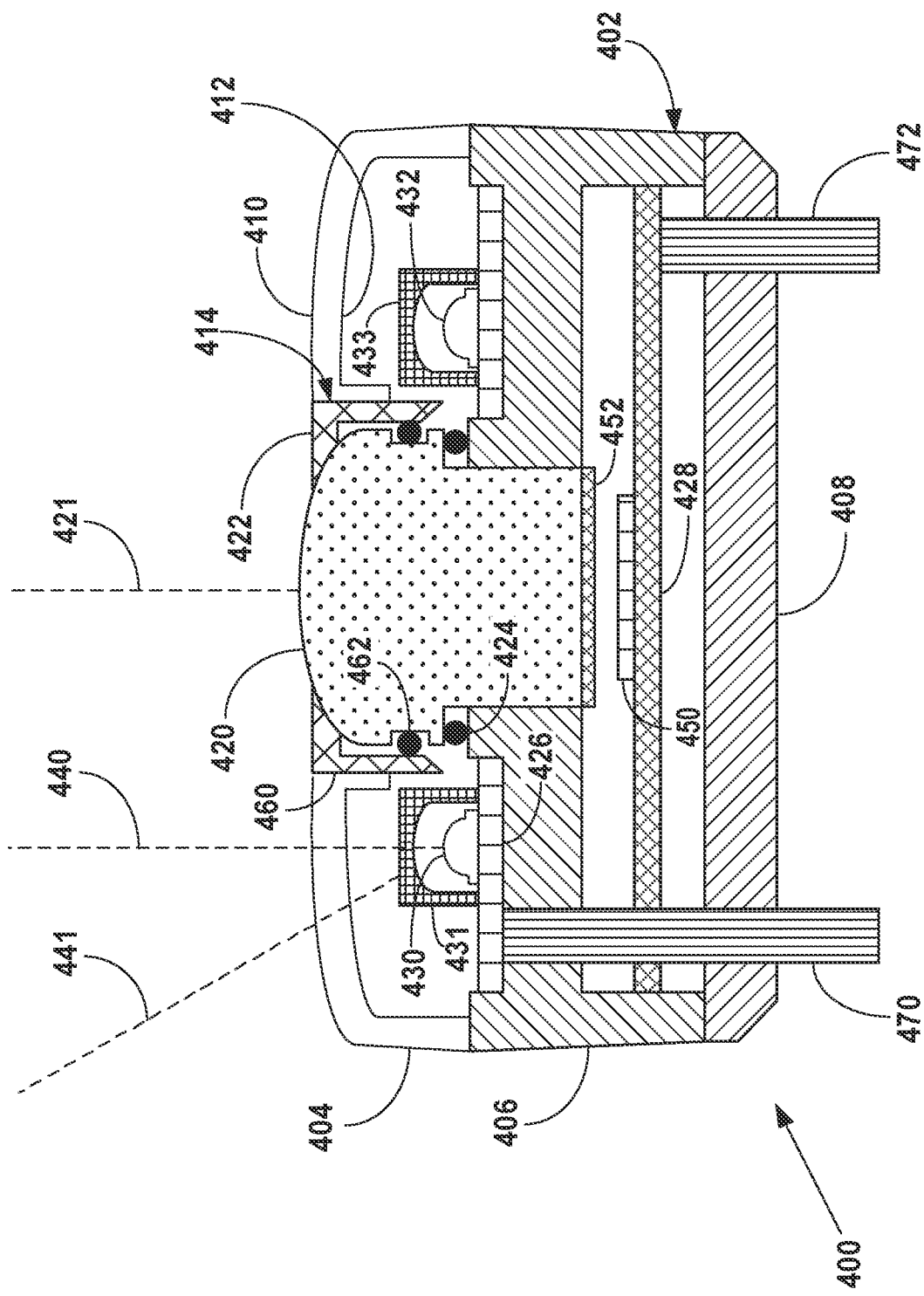
FIG. 4A is a side sectional view of a camera module, according to example embodiments.
Figure 4B:
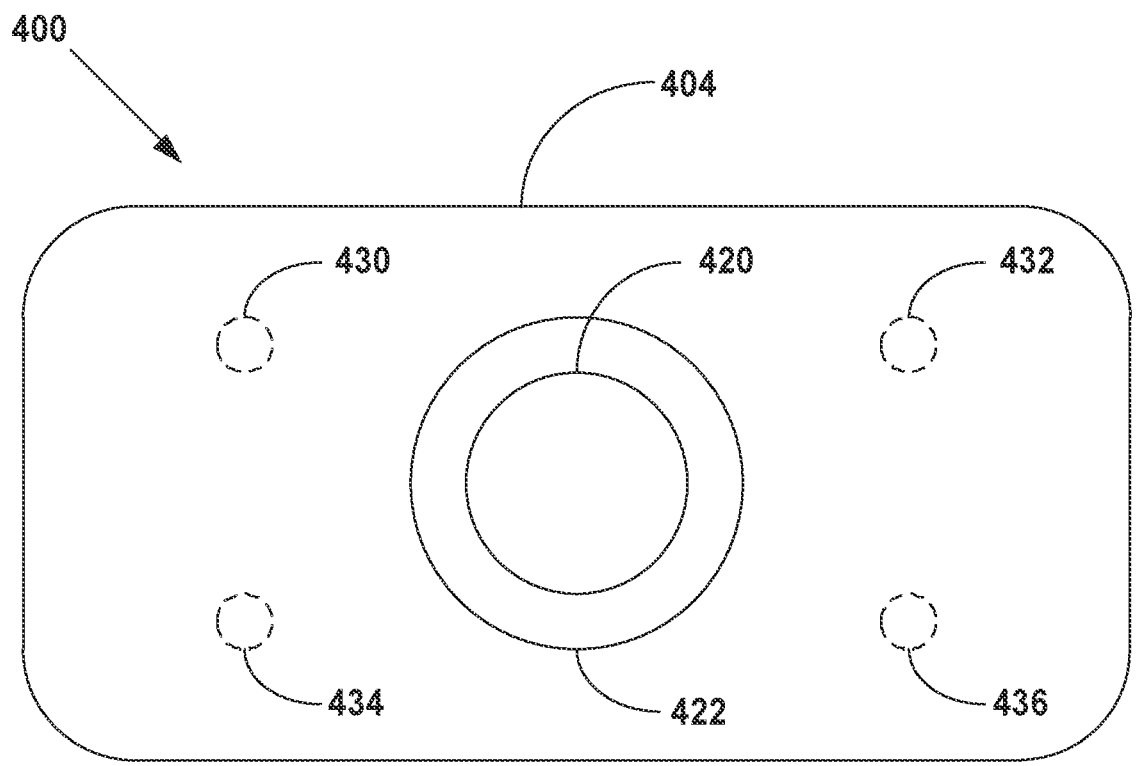
FIG. 4B is a front view of the camera module of FIG. 4A, according to example embodiments.

FIGS. 4A and 4B illustrate an example camera module 400. FIG. 4A is a sectional view of the camera module 400. FIG. 4B is a front view of the camera module. In this example, the camera module 400 includes a housing 402 that is made up of a front cover 404, a main body 406, and a rear cover 408. The front cover 404 is made of a material (e.g., a plastic material) that is transparent to near infrared light but is opaque to visible light. The front cover 404 has an outer surface 410, an inner surface 412, and an opening 414 that extends through the front cover 404. As shown in FIG. 4B, the front cover 404 has a rectangular shape with four (rounded) corners.

A fisheye lens 420 is disposed within the opening 414 of the front cover 404. As shown, the fisheye lens 420 protrudes through the opening 414 such that a portion of the fisheye lens 420 is in front of the outer surface 410 of the front cover 404 and a portion of the fisheye lens 420 is behind the outer surface 410 of the front cover. The fisheye lens has an optical axis 421. In this example, an opaque ring 422 is also disposed within the opening 414 so as to surround the fisheye lens 420 within the opening 414. The opaque ring 422 is made of a material (e.g., a metal) that is opaque to visible and near infrared wavelengths of light. In this way, the position of the opaque ring 422 relative to the fisheye lens 420 defines the field of view of the fisheye lens 420.

In examples, the resulting field of view of the fisheye lens 420 could be less than 180 degrees, less than 170 degrees, less than 160 degrees, or less than 150 degrees, depending on the relative arrangement of the fisheye lens 420 and the opaque ring 422. However, in order to obtain images within a wide field of view, it is preferable for the resulting field of view of the fisheye lens 420 to be greater than 90 degrees, greater than 100 degrees, greater than 110 degrees, or greater than 120 degrees, depending on the application. In example embodiments, the field of view of the fisheye lens 420 is symmetric about the optical axis 421 of the fisheye lens 420. However, the field of view of the fisheye lens 420 could have different angular ranges in different directions. For example, in FIG. 4A, the field of view of the fisheye lens 420 could have a greater angular range in the plane of the page than in a plane perpendicular to the page (or vice versa). The different angular ranges in different direction could result, for example, from the shape of the image sensor (e.g., image sensor 450), from one or more baffles, or from other optical components in camera module 400.

The main body 406 and rear cover 408 are each made of a material (e.g., a plastic or a metal) that is opaque to visible and near infrared wavelengths of light. The main body 406 is attached on one side to the front cover 404 and is attached on another side to the rear cover 408. Any means of attachment could be used, such as snap-fit features, screws, bolts, rivets, welding, etc. The main body 406 may be configured to support various components within the camera module 400. As shown, the main body 406 supports the fisheye lens 420. For example, the fisheye lens 420 can include threads that mate with corresponding threads in main body 406 (not shown) such that the fisheye lens 420 can be screwed into the main body 406 and compress a seal 424 (e.g., a gasket or an O-ring) against the main body 406.

The main body 406 also supports printed circuit boards (PCBs) 426 and 428. PCB 426 mounts a plurality of light emitting diodes (LEDs), exemplified in FIG. 4A by LEDs 430 and 432. Although FIG. 4A shows two LEDs, it is to be understood that camera module 400 could include any number of LEDs (or other types of light sources). For example, the front view of camera module 400 shown in FIG. 4B shows four LEDs 430-436, which are arranged symmetrically around the fisheye lens 420. In example embodiments, the LEDs 430-436 each emit near infrared light (e.g., with a peak wavelength of 850 nm and a full-width at half maximum of 35 nm). However, other wavelength ranges could be used as well (e.g., wavelengths in the ultraviolet, visible, or infrared portions of the electromagnetic spectrum).

Each of LEDs 430-436 could be provided with a respective cover lens, exemplified in FIG. 4A by cover lens 431 over LED 430 and cover lens 433 over LED 432. Each cover lens can be shaped so as to shift the angular dependence of the corresponding LED's illumination intensity away from the LED's optical axis. For example, FIG. 4A shows that LED 430 has an optical axis 440 that is parallel to optical axis 421 of fisheye lens 420. Thus, in the absence of any other optical components in the path of illumination, the illumination from LED 430 would have a peak intensity along the optical axis 440. However, the cover lens 431 over LED 430 can be shaped so as to shift the peak intensity toward a different direction, exemplified in FIG. 4A by shifted direction 441. The shifted direction 441 could be at an angle relative to the optical axis 421 of the fisheye lens 420 (e.g., an angle that is about 15 degrees in the plane of the page of FIG. 4A and about 10 degrees in a plane perpendicular to the page). With reference to FIG. 4B, the cover lenses could shift the direction of peak intensity of each of LEDs 300-306 toward a corresponding corner of the rectangular front cover 404.

Figure 4C:
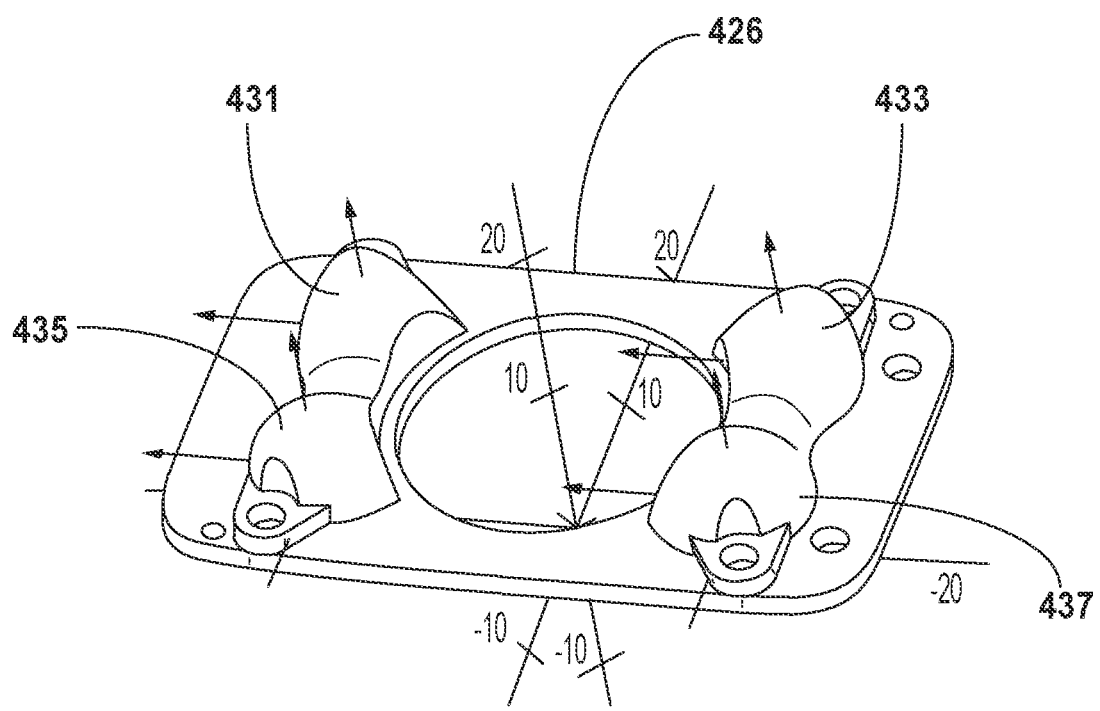
FIG. 4C is a perspective view of a printed circuit board in the camera module of FIG. 4A with asymmetric cover lenses mounted thereon, according to example embodiments.

This shift of the direction of peak intensity for each of LEDs 300-306 can be achieved by providing the corresponding cover lenses with an asymmetric shape, for example, as shown in FIG. 4C. FIG. 4C is a perspective view of PCB 426 with cover lenses 431, 433, 435, and 437 mounted thereon so as to cover LEDs 430, 432, 434, and 436, respectively. The cover lenses 431-437 are each made of a material (e.g., a plastic material) that refracts the wavelengths emitted by the LEDs 430-436. In each cover lens, the thickness of the material varies as a function of azimuthal angle about the optical axis of the corresponding LED, such that the thickness (and the corresponding optical power) is greatest at azimuthal angles that point toward a corresponding corner of PCB 426. In this way, each cover lens focuses the light emitted by its corresponding LED toward a corresponding corner of PCB 426 and, thus, a corresponding corner of front cover 404.

Figure 4D:
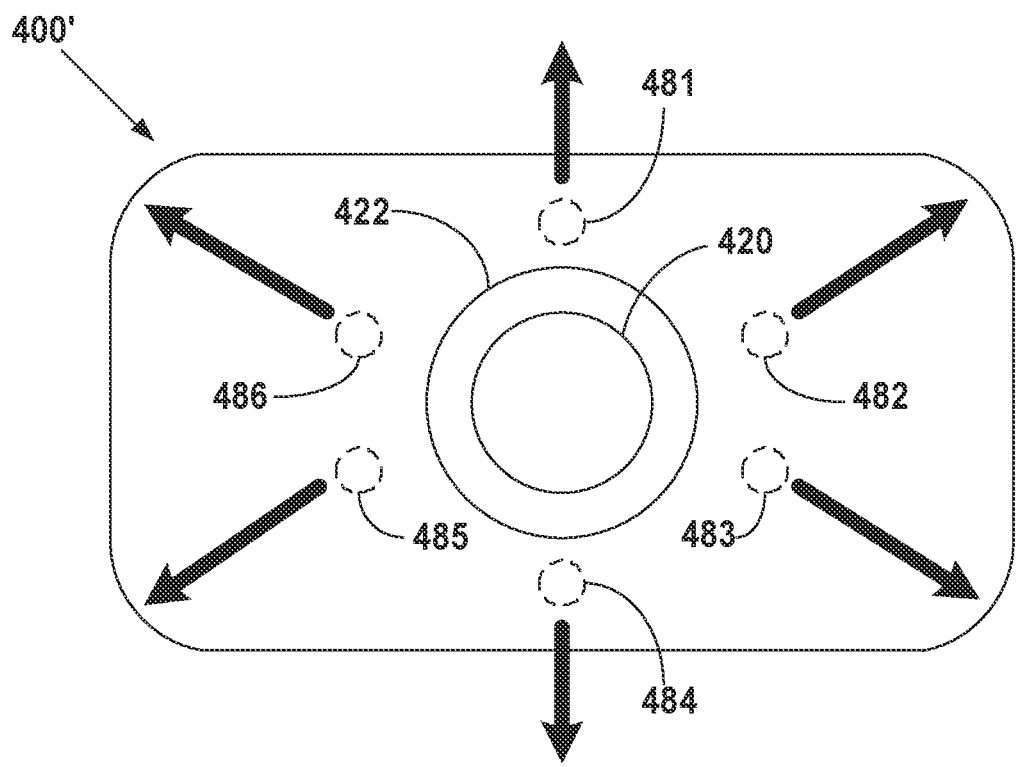
FIG. 4D is a front view of an alternative camera module, according to example embodiments.

Although four LEDs are illustrated in the example shown in FIG. 4B, it is to be understood that a greater or fewer number of LEDs could be included. For example, an alternative camera module 400' may include six LEDs (LEDs 481-486) arranged around the fisheye lens 420, as shown in FIG. 4D. Each of the LEDs 481-486 may include a respective cover lens that directs the emitted light in a particular direction. As shown, the cover lenses for LEDs 482, 483, 485, and 486 are configured to direct light toward respective corners, whereas the cover lenses for LEDs 481 and 484 are configured to direct light toward opposite sides, as indicated by the corresponding arrows. Alternatively, the LEDs 481-486 could be provided with cover lenses to direct light in a symmetrical pattern around the fisheye lens 420. Other arrangements are possible as well. In addition, while a generally rectangular shape is shown for camera module 400 in FIG. 4B and for alternative camera module 400' in FIG. 4D, other shapes are possible as well (e.g., square, circular, elliptical, etc.).

An image sensor 450 is mounted on PCB 428. The image sensor 450 could be a charge-coupled device (CCD), an active-pixel sensor (APS), an array of photodiodes, or any other type of light sensor that can obtain two-dimensional images. In example embodiments, the image sensor 450 is sensitive to visible wavelengths of light and also to near infrared wavelengths, such as the near infrared wavelengths of the light emitted by LEDs 430-436.

The image sensor 450 is optically coupled to the fisheye lens 420 so as to capture still and/or video images of the field of view provided by the fisheye lens 420 (as limited by the opaque ring 422). The image sensor 450 could be used to capture images either with or without active illumination by LEDs 430-436. For example, if the intensity of ambient light is sufficiently high (e.g., during daylight conditions), the image sensor 450 may be used to capture images without activating LEDs 430-436. However, if the intensity of ambient light is sufficiently low (e.g., at night or during other low-light conditions), the image sensor 450 may capture images while LEDs 430-436 illuminate the field of view of the fisheye lens 420. Specifically, the LEDs 430-436 illuminate the field of view by emitting near infrared (NIR) light that is transmitted through their respective cover lenses 431-437 and through the NIR-transparent front cover 404.

In example embodiments, the image sensor 450 is optically coupled to the fisheye lens 420 via an optical filter 452. The optical filter 452 may filter out wavelengths that are outside of the visible spectrum, except for the wavelengths of the near infrared light emitted by the LEDs 430-436. For example, the optical filter 452 may include a first passband that passes visible wavelengths (e.g., wavelengths between 400 nm and 700 nm) and a second passband that passes the wavelengths emitted by the LEDs 430-436 (e.g, wavelengths between 820 nm and 880 nm). The optical filter 452 could be mounted to the fisheye lens 420 as shown in FIG. 4A.

When LEDs 430-436 are used to provide illumination for the camera module 400 (e.g., during low-light conditions), it is beneficial for the LEDs 430-436 to illuminate the field of view of fisheye lens 420 as uniformly as possible. For example, it may be desirable for the intensity of the light emitted by the LEDs 430-436 to vary less than 20%, less than 30%, less than 40%, or less than 50% over the entire field of view of the fisheye lens 420, depending on the application.

To achieve this uniformity the front cover 404 can include light-diffusing structures that diffuse, scatter, or otherwise spread out the light emitted by the LEDs 430-436. In example embodiments, the light-diffusing structures are microlenses that are formed on at least a portion of the inner surface 412 of the front cover 404. The microlenses can be formed by molding the material of the front cover 404.

The microlenses can have any dimension that can be achieved by the molding process. The thickness of the microlenses is limited by the thickness of the front cover 404. To reduce the risk of cosmetic defects, the thickness of the microlenses may be limited to about 30% of the thickness of the cover. However, if there are no cosmetic concerns, the microlens thickness could be thicker up until it causes air trap or major sink issues with the part. Depending on geometry and gating, the thickness of the micro lenses could be up to approximately ⅔ of the nominal wall thickness of the front cover 404 before seeing these types of issues.

The length and width of the microlenses are limited by the ability of the molten plastic to properly fill the space in the molding tool. This depends on various material properties of the plastic resin, such as melt flow index. In an example embodiment, each microlens is about 1 mm long and 1 mm wide. However, the length and width of the microlenses could be smaller, such as 0.3 mm×0.3 mm. It is also possible to shape microlenses using post injection molding steps, such as by using computer numerical control (CNC) machining.

The opaque ring 422 defines the field of view of the fisheye lens, as discussed above. However, the opaque ring 422 can also be structured to prevent light emitted by the LEDs 300-306 from entering the fisheye lens 420 via either a direct path or an indirect path within the camera module 400. A direct path would correspond to a straight line going directly from an LED to the fisheye lens 420. An indirect path would correspond to a reflection from a surface of the front cover (e.g., a reflection from the outer surface 410 or the inner surface 412) that results in the light going toward the fisheye lens 420. To block such direct or indirect paths, the opaque ring 422 can include a light shield 460 that surrounds the fisheye lens 420 over an axial length that extends at least part of the way to PCB 426. The light shield 460 can be coupled to the fisheye lens 420 via a light-tight seal 462 (e.g., an O-ring). In this way, the light shield 460 provides an opaque barrier between the front cover 404, LEDs 430-436, and cover lenses 431-437 and the fisheye lens 420.

The rear cover 408 can include mounting holes, mounting brackets, or other mounting structures (not shown) that enable the camera module 400 to be mounted at a desired location. For example, the camera module 400 could be mounted inside the passenger cabin (e.g., on the ceiling of the passenger cabin) of a vehicle (e.g., an autonomous vehicle). However, the camera module 400 could be mounted at other locations as well, depending on the application.

The rear cover 408 can support electrical connections for controlling and powering the components of the camera module 400. As shown, rear cover 408 supports an electrical connection 470 to the LEDs 430-436 and an electrical connection 472 to the image sensor 450. In an example embodiment, the electrical connection 470 could include an MQS connector, and the electrical connection 472 could include a FAKRA connector.

Figure 5:
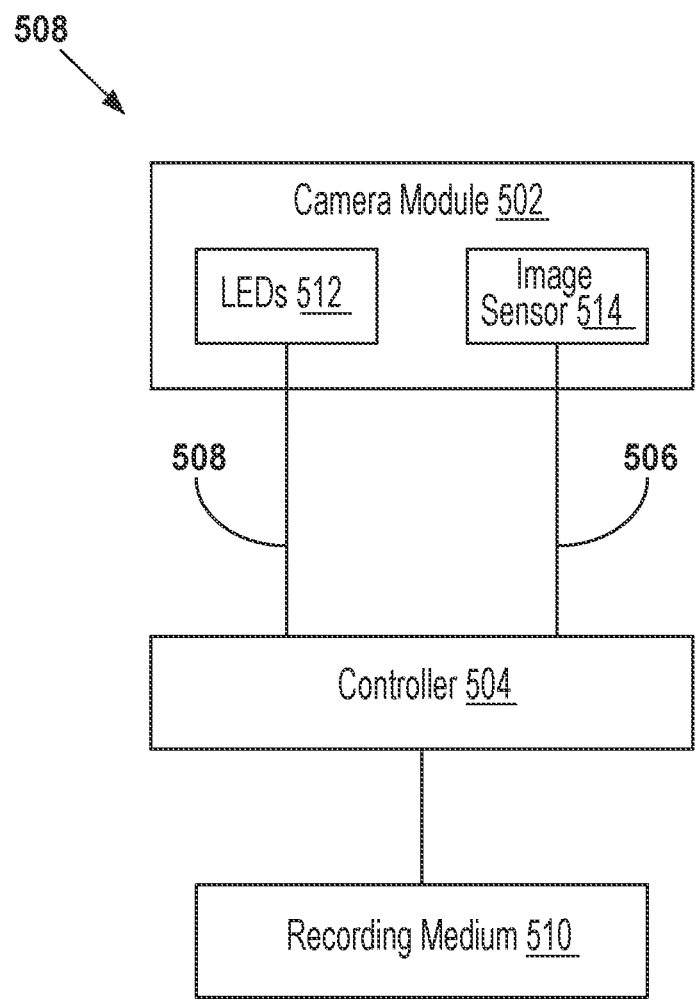
FIG. 5 is a functional block diagram of an image capture system for a vehicle, according to example embodiments.

FIG. 5 is a functional block diagram illustrating an example image capture system 500 for a passenger cabin of a vehicle (e.g., vehicle 100). The system 500 includes a camera module 502 communicatively coupled to a controller 504, via an image capture interface 506 and an LED control interface 508, and a recording medium 510 communicatively coupled to the controller.

The camera module 502 could be similar to camera module 400 and may include LEDs 512 (e.g., similar to LEDs 430-436) and an image sensor 514 (e.g., similar to image sensor 450) that is optically coupled to a wide angle lens (e.g., similar to fisheye lens 420). The camera module 502 could be mounted in the passenger cabin of the vehicle and configured to capture images (e.g., still images and/or video images) of a portion of the passenger cabin that is within the field of view of the camera module 502. The field of view could be defined by the lens (e.g., fisheye lens 420) that is optically coupled to the image sensor 514. The field of view could be sufficiently wide so as to include all of the passenger seating areas within the cabin of the vehicle (e.g., front seats and back seats). The LEDs 512 could be configured to emit near infrared light (e.g., at a wavelength of 850 nm), and the image sensor 514 could be sensitive to both visible light and the near infrared light emitted by the LEDs 512.

The controller 504 could be located in the vehicle or remotely from the camera module 502. Thus, the image capture interface 506 and the LED control interface 508 could each include wired and/or wireless connections within the vehicle. In example embodiments, the controller 504 is a computing device that includes a processor and data storage with program instructions that are executable by the processor to perform any of the operations described herein. For example, controller 504 could correspond to computer system 112.

The recording medium 510 could include volatile memory, non-volatile memory, one or more hard drives, or any other medium that can store images captured by the image sensor 512. In some embodiments, the recording medium 510 could be located in the vehicle along with the controller 504. Alternatively, the recording medium 510 could be located remotely from the vehicle (e.g., in remote computing system 302 or in server computing system 306).

In operation, the controller 504 controls the camera module 502 to capture images under various lighting conditions. The controller 504 could control the camera module 502 to capture images whenever the vehicle is in operation or, alternatively, only under certain conditions (e.g., in request to a request from a passenger or in response to a request from a remote assistance center).

To control the camera module 502 to capture images, the controller 504 could send instructions to the image sensor 514 via the image capture interface 506. The instructions may specify the type of image to capture (e.g., whether to capture still images or video), the frequency of image capture (e.g., whether to capture images continually, every few seconds, or every few minutes, etc.), as well as image capture parameters (e.g., exposure times). When the image sensor 514 captures an image, the controller 504 may receive data indicative of the captured image via the image capture interface 506 and store the captured image data in the recording medium 510.

The controller 504 may also determine whether to use illumination from the LEDs 512 when the camera module 502 is capturing images. The controller may control the LEDs 512 (e.g., to turn the LEDs 512 on or off and/or to adjust the intensity of the near infrared light emitted by the LEDs 512) via the LED control interface 508. To determine whether to use illumination from the LEDs 512, the controller 504 may take into account the time of day, the lighting conditions in the passenger cabin (e.g., as determined from images captured by the camera module 502 or as determined by some other light sensor), and/or other factors. For example, during daylight hours, the controller 504 may normally rely on ambient light and not use illumination from the LEDs 512 when capturing images, whereas at night the controller 504 may normally use illumination from the LEDs 512 when capturing images.

Alternatively or additionally, the controller 504 may evaluate the quality of the captured images (e.g., the brightness and/or contrast of the captured images) to determine whether to use illumination from the LEDs 512 when capturing images. For example, if the controller 504 determines that the brightness of one or more images captured by the camera module 502 using ambient light without illumination from the LEDs 512 is too low, then the controller 504 may turn the LEDs 512 on so that they illuminate the field of view while the camera module 502 captures one or more subsequent images. On the other hand, if the controller 504 determines that the brightness of one or more images captured by the camera module 502 using illumination from the LEDs 512 is too high, then the controller may turn the LEDs off so that they no longer illuminate the field of view when the camera module 502 captures one or more subsequent images. In this way, the controller 504 may control the camera module 502 to capture images in a wide range of lighting conditions.

IV. EXAMPLE METHODS

Figure 6:
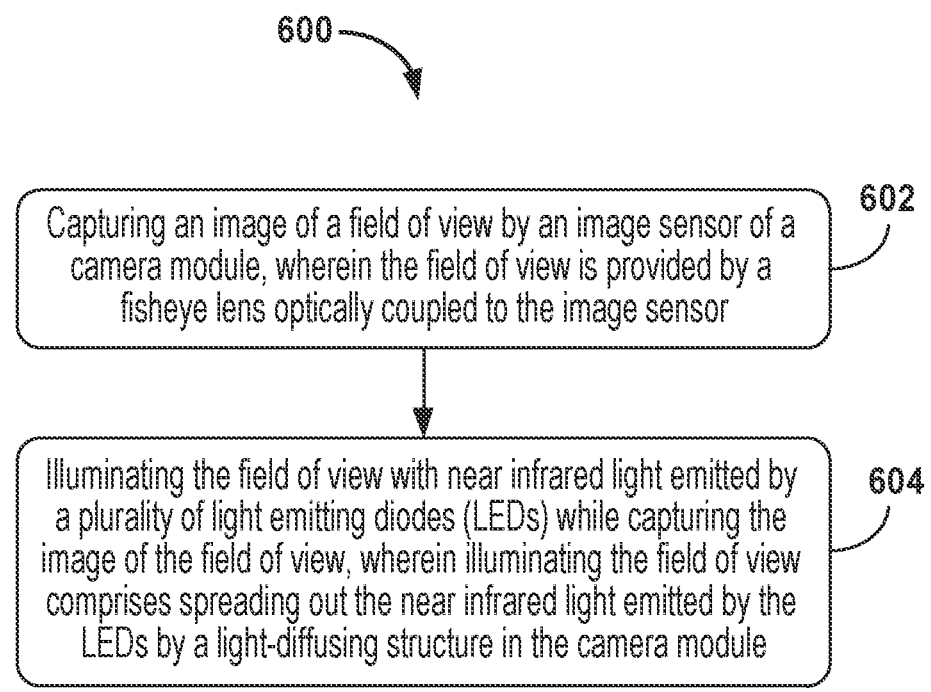
FIG. 6 is a flow chart of a method, according to example embodiments.

FIG. 6 is a flowchart illustrating an example method 600. In some examples, the method 600 could involve a camera module that is the same or similar to camera module 400 illustrated in FIGS. 4A and 4B. In some examples, the method 600 could involve an image capture system that is the same or similar to image capture system 500 illustrated in FIG. 5.

Method 600 may include capturing an image of a field of view by an image sensor of a camera module, wherein the field of view is provided by a fisheye lens optically coupled to the image sensor, as indicated by block 602. The captured image could be, for example, a still image or a frame of a video image.

Method 600 may further include illuminating the field of view with near infrared light emitted by a plurality of light emitting diodes (LEDs) while capturing the image of the field of view, wherein illuminating the field of view comprises spreading out the near infrared light emitted by the LEDs by a light-diffusing structure in the camera module, as indicated by block 604.

In example embodiments, the camera module includes a NIR-transparent cover that is transparent to near infrared light and opaque to visible light. The light-diffusing structure could include a pattern of microlenses formed on an inner surface of the NIR-transparent cover. The microlenses may spread out the near infrared light emitted by the LEDs to provide substantially uniform illumination throughout the field of view.

The NIR-transparent cover could include an opening through which a portion of the fisheye lens protrudes. An opaque ring may also be disposed in the opening. The opaque ring may define the field of view of the fisheye lens and may block stray from within the camera module from entering the fisheye lens.

The NIR-transparent cover could have a rectangular shape with four corners. The plurality of LEDs could include four LEDs, with each LED proximate a respective corner of the NIR-transparent cover. Further, illuminative the field of view could involve directing the near infrared light emitted by each LED toward LED's respective corner, for example, by a respective lens cover over each LED.

In example embodiments, the camera module could be mounted in a passenger cabin of a vehicle, and the field of view could may encompass at least a portion of the passenger cabin (e.g., a portion in which passengers may be seated). In such examples, method 600 may further involve recording the captured image in a recording medium within the vehicle.

V. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including random-access memory (RAM), a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An apparatus, comprising:
a housing, wherein the housing includes an opening and a portion that surrounds the opening, wherein the portion of the housing is transparent to near infrared (NIR) light, and wherein the NIR-transparent portion of the housing includes a light-diffusing structure;
a fisheye lens disposed within the opening such that a portion of the fisheye lens protrudes through the opening;
an opaque ring disposed within the opening, wherein the opaque ring surrounds the fisheye lens so as to define a field of view of the fisheye lens;
an image sensor disposed within the housing and optically coupled to the fisheye lens, wherein the image sensor is sensitive to visible light and NIR light;
a plurality of optical structures disposed within the housing; and
a plurality of NIR light emitters disposed within the housing and configured to emit NIR light through the plurality of optical structures and the light-diffusing structure in the NIR-transparent portion of the housing such that a light intensity of the light emitted by the plurality of NIR light emitters varies less than 50% over the field of view of the fisheye lens, wherein each optical structure is optically coupled to a corresponding NIR light emitter and comprises an asymmetric cover lens configured to direct NIR light emitted by the corresponding NIR light emitter away from an optical axis of the corresponding NIR light emitter, the asymmetric cover lens having an optical power that varies as a function of azimuthal angle about the optical axis of the corresponding NIR light emitter, and wherein each optical structure is configured to direct NIR light emitted by the corresponding NIR light emitter away from the optical axis of the corresponding NIR light emitter such that the directed NIR light has a peak intensity at an angle between 5 degrees and 20 degrees with respect to an optical axis of the fisheye lens.

2. The apparatus of claim 1,
wherein the opaque ring blocks NIR light from entering the fisheye lens via (i) a direct path from the NIR light emitters and (ii) via an indirect path involving reflection from a surface of the NIR-transparent portion of the housing.

3. The apparatus of claim 1, wherein the light-diffusing structure comprises a pattern of microlenses, wherein the microlenses are configured to spread out the NIR light emitted by the plurality of NIR light emitters.

4. The apparatus of claim 3, wherein the microlenses are formed on an inner surface of the NIR-transparent portion of the housing.

5. The apparatus of claim 1, wherein the plurality of NIR light emitters comprise a plurality of light emitting diodes (LEDs).

6. The apparatus of claim 1, wherein the plurality of NIR light emitters includes at least four NIR light emitters arranged around the fisheye lens, and wherein the NIR-transparent portion of the housing has a rectangular shape with four corners.

7. The apparatus of claim 6, wherein each optical structure is configured to direct NIR light emitted by the corresponding NIR light emitter toward a respective corner of the NIR-transparent portion of the housing.

8. The apparatus of claim 1, wherein the NIR-transparent portion of the housing is opaque to visible light.

9. The apparatus of claim 1, further comprising:
an optical filter, wherein the image sensor is optically coupled to the fisheye lens via the optical filter.

10. The apparatus of claim 7, wherein each asymmetric cover lens has a thickness that varies as a function of azimuthal angle such that the thickness is greatest at azimuthal angles that point toward a corresponding corner of the housing.

11. The apparatus of claim 9, wherein the optical filter has a first passband that passes visible wavelengths and a second passband that passes NIR wavelengths emitted by the NIR light emitters.

12. A camera module, comprising:
a housing, wherein the housing includes an opening and a portion that surrounds the opening, wherein the portion of the housing is transparent to near infrared (NIR) light and opaque to visible light, and wherein the NIR-transparent portion of the housing includes a light-diffusing structure;
a fisheye lens disposed within the opening such that a portion of the fisheye lens protrudes through the opening;
an opaque ring disposed within the opening, wherein the opaque ring surrounds the fisheye lens so as to define a field of view of the fisheye lens;
an image sensor disposed within the housing and optically coupled to the fisheye lens, wherein the image sensor is sensitive to visible light and NIR light;
a plurality of optical structures disposed within the housing; and
a plurality of NIR light emitters disposed within the housing and configured to emit NIR light through the plurality of optical structures and the light-diffusing structure such that a light intensity of the light emitted by the plurality of NIR light emitters varies less than 50% over the field of view of the fisheye lens, wherein each optical structure is optically coupled to a corresponding NIR light emitter and comprises an asymmetric cover lens configured to direct NIR light emitted by the corresponding NIR light emitter away from an optical axis of the corresponding NIR light emitter, the asymmetric cover lens having an optical power that varies as a function of azimuthal angle about the optical axis of the corresponding NIR light emitter, and wherein each optical structure is configured to direct NIR light emitted by the corresponding NIR light emitter away from the optical axis of the corresponding NIR light emitter such that the directed NIR light has a peak intensity at an angle between 5 degrees and 20 degrees with respect to an optical axis of the fisheye lens.

13. The camera module of claim 12, wherein the light-diffusing structure comprises a pattern of microlenses, wherein the microlenses are formed on an inner surface of the NIR-transparent portion of the housing.

14. The camera module of claim 12,
wherein the opaque ring blocks NIR light from entering the fisheye lens via (i) a direct path from the NIR light emitters and (ii) via an indirect path involving reflection from a surface of the NIR-transparent portion of the housing.

15. A method, comprising:
capturing an image of a field of view by an image sensor of a camera module, wherein the field of view is provided by a fisheye lens optically coupled to the image sensor; and
illuminating the field of view with near infrared (NIR) light emitted by a plurality of NIR light emitters through a plurality of optical structures while capturing the image of the field of view, wherein illuminating the field of view comprises spreading out the NIR light emitted by the plurality of NIR light emitters through the plurality of optical structures by a light-diffusing structure in the camera module such that a light intensity of the light emitted by the plurality of NIR light emitters varies less than 50% over the field of view provided by the fisheye lens, wherein each optical structure is optically coupled to a corresponding NIR light emitter and comprises an asymmetric cover lens configured to direct NIR light emitted by the corresponding NIR light emitter away from an optical axis of the corresponding NIR light emitter, the asymmetric cover lens having an optical power that varies as a function of azimuthal angle about the optical axis of the corresponding NIR light emitter, and wherein each optical structure is configured to direct NIR light emitted by the corresponding NIR light emitter away from the optical axis of the corresponding NIR light emitter such that the directed NIR light has a peak intensity at an angle between 5 degrees and 20 degrees with respect to an optical axis of the fisheye lens.

16. The method of claim 15, wherein the camera module includes a NIR-transparent cover that is transparent to near infrared light and opaque to visible light.

17. The method of claim 16, wherein the light-diffusing structure comprises a pattern of microlenses formed on an inner surface of the NIR-transparent cover.

18. The method of claim 15, wherein the camera module is mounted in a passenger cabin of a vehicle.

19. The method of claim 18, further comprising:
recording the image in a recording medium within the vehicle.

20. The method of claim 15, wherein the camera module includes an opaque ring, wherein the opaque ring surrounds the fisheye lens so as to define the field of view provided by the fisheye lens.

* * * * *